(12) United States Patent
El Amili et al.

(10) Patent No.: US 11,936,082 B2
(45) Date of Patent: Mar. 19, 2024

(54) OPTICAL CONTROL OF AN ELECTRICAL WAVEGUIDE SWITCH USING A PHOTOCONDUCTIVE PATCH CONTROLLED BY OPTICAL POWER SUPPLIED BY AN OPTICAL WAVEGUIDE

(71) Applicant: The Regents of the University of California, Oakland, CA (US)

(72) Inventors: Abdelkrim El Amili, La Jolla, CA (US); Yeshaiahu Fainman, La Jolla, CA (US); Cheng-Yi Fang, La Jolla, CA (US); Hung-Hsi Lin, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 606 days.

(21) Appl. No.: 17/006,761

(22) Filed: Aug. 28, 2020

(65) Prior Publication Data
US 2021/0063838 A1 Mar. 4, 2021

Related U.S. Application Data

(60) Provisional application No. 62/893,010, filed on Aug. 28, 2019.

(51) Int. Cl.
*H01P 1/15* (2006.01)
*G02F 1/01* (2006.01)
(Continued)

(52) U.S. Cl.
CPC .............. *H01P 1/15* (2013.01); *G02F 1/011* (2013.01); *G02F 1/0338* (2013.01); *G02F 1/21* (2013.01);
(Continued)

(58) Field of Classification Search
CPC ........................................................ H01P 1/15
(Continued)

(56) References Cited

U.S. PATENT DOCUMENTS 3,917,943 A * 11/1975 Auston .................. H01L 31/09
257/E31.093
4,396,833 A * 8/1983 Pan .......................... H01P 1/15
250/214 R
(Continued)

OTHER PUBLICATIONS

Ali, K. B., et al. Photo-Induced Coplanar Waveguide RF Switch and Optical Crosstalk on High-Resistivity Silicon Trap-Rich Passivated Substrate. IEEE Trans. Electron Devices 60, 3478-3484 (2013).
(Continued)

*Primary Examiner* — Benny T Lee
(74) *Attorney, Agent, or Firm* — Perkins Coie LLP

(57) ABSTRACT

Microwave photonic devices use light to carry and process microwave signals over a photonic link. Light can be used as a stimulus to microwave devices that directly control microwave signals. Previous optically controlled devices suffer from large footprint, high optical power level required for switching, lack of scalability and complex integration requirements, restricting their implementation in practical microwave systems. Disclosed are monolithic optically reconfigurable integrated microwave switches (MORIMSs) built on a CMOS compatible silicon photonic chip. The disclosed scalable micrometer-scale switches provide higher switching efficiency and operate using optical power that is orders of magnitude lower than previous devices. The disclosed devices and techniques provide examples of silicon photonic platforms integrating microwave circuitry.

21 Claims, 10 Drawing Sheets

(51) Int. Cl.
G02F 1/03 (2006.01)
G02F 1/21 (2006.01)
H01P 3/00 (2006.01)
H01P 3/16 (2006.01)
H01P 5/00 (2006.01)

(52) U.S. Cl.
CPC ............... *H01P 3/00* (2013.01); *H01P 3/003* (2013.01); *H01P 3/16* (2013.01); *H01P 5/00* (2013.01); *G02F 1/212* (2021.01); *G02F 2201/16* (2013.01); *G02F 2203/055* (2013.01)

(58) Field of Classification Search
USPC ......................................................... 333/262
See application file for complete search history.

(56) References Cited

U.S. PATENT DOCUMENTS

| | | | | |
|---|---|---|---|---|
| 5,574,464 | A | * 11/1996 | Madonna et al. | ......... H01P 1/15 342/198 |
| 5,969,581 | A | * 10/1999 | Hart | ......................... H01P 1/15 333/81 B |

OTHER PUBLICATIONS

Andy, A., et al. An optically-switched frequency reconfigurable antenna for cognitive radio applications. in 2016 10th European Conference on Antennas and Propagation (EuCAP) 1-4 (2016).
Asghari, M. et al. Silicon photonics: Energy-efficient communication. Nature Photonics (2011). doi:10.1038/nphoton.2011.68.
Burla, M. et al. On-chip programmable ultra-wideband microwave photonic phase shifter and true time delay unit. Opt. Lett. 39, 6181 (2014).
Canseliet, C. et al. A novel optically-controlled microwave switch on semiconductor substrates for an ON/OFF ratio enhancement. in 33rd European Microwave Conference Proceedings (IEEE Cat. No.03EX723C) 1, 265-268 vol. 1 (2003).
Capmany, J. et al. Microwave Photonic Signal Processing. J. Light. Technol. 31, 571-586 (2013).
Capmany, J. et al. Microwave photonics combines two worlds. Nat. Photonics 1, 319-330 (2007).
Chen, H. et al. Integrated Microwave Photonic Filter on a Hybrid Silicon Platform. IEEE Trans. Microw. Theory Tech. 58, 3213-3219 (2010).
Costa, I. F. da et al. Optically controlled reconfigurable antenna for 5G future broadband cellular communication networks. J. Microw. Optoelectron. Electromagn. Appl. 16, 208-217 (2017).
Fandiño, J. S., et al. A monolithic integrated photonic microwave filter. Nat. Photonics 11, 124-129 (2017).
Fang, A. W. et al. Hybrid silicon evanescent devices. Mater. Today 10, 28-35 (2007).
Flemish, J. R. et al. Optimization of a Photonically Controlled Microwave Switch and Attenuator. IEEE Trans. Microw. Theory Tech. 58, 2582-2588 (2010).
Flemish, J. R., et al. A new silicon-based photoconductive microwave switch. Microw. Opt. Technol. Lett. 51, 248-252.
Kaneko, Y. et al. Microwave switch: LAMPS (light-activated microwave photoconductive switch). Electron. Lett. 39, 917-919 (2003).
Karabegovic, A., et al. Photoconductive switch design for microwave applications. IEEE Trans. Dielectr. Electr. Insul. 16, 1011-1019 (2009).
Kelkar, K. S., et al. Silicon carbide photoconductive switch for high-power, linear-mode operations through sub-band-gap triggering. J. Appl. Phys. 98, 093102 (2005).
Lan, L., et al. Influence of laser wavelength on insertion loss of silicon-based optically controlled microwave switch. Microw. Opt. Technol. Lett. 55, 187-190.
Liu, W. et al. A fully reconfigurable photonic integrated signal processor. Nat. Photonics 10, 190-195 (2016).
Majda-Zdancewicz, E., et al. Current state of photoconductive semiconductor switch engineering. Opto-Electron. Rev. 26, 92-102 (2018).
Marpaung, D. et al. Integrated microwave photonics. Laser Photonics Rev. 7, 506-538 (2013).
Nikfalazar, M., et al. Two-dimensional beam-steering phased-array antenna with compact tunable phase shifter based on BST thick films. IEEE Antennas and Wireless Propagation Letters, 16, 585 (2016).
Ospald, F. et al. 1.55 μm ultrafast photoconductive switches based on ErAs:InGaAs. Appl. Phys. Lett. 92, 131117 (2008).
Panagamuwa, C. J., et al. Frequency and beam reconfigurable antenna using photoconducting switches. IEEE Trans. Antennas Propag. 54, 449-454 (2006).
Pant, R. et al. On-chip stimulated Brillouin Scattering for microwave signal processing and generation. Laser Photonics Rev. 8, 653-666 (2014).
Patron, D., et al. Optical control of pattern-reconfigurable planar antennas. in 2013 IEEE International Topical Meeting on Microwave Photonics (MWP) 33-36 (2013).
Penillard, A., et al. Exploring the promising properties of 2D exfoliated black phosphorus for optoelectronic applications under 1.55 μm optical excitation. Photonic Crystal Materials and Devices XII. 9885, 988514 (2016).
Pérez, D. et al. Multipurpose silicon photonics signal processor core. Nat. Commun. 8, (2017).
Platte, W. Effective photoconductivity and plasma depth in optically quasi-CW controlled microwave switching devices. IEE Proc. J—Optoelectron. 135, 251-254 (1988).
Saddow, S. E. et al. Optical control of microwave-integrated circuits using high-speed GaAs and Si photoconductive switches. IEEE Trans. Microw. Theory Tech. 43, 2414-2420 (1995).
Sayad, Y., et al. Determination of diffusion length in photovoltaic crystalline silicon by modelisation of light beam induced current. Superlattices Microstruct. 45, 393-401 (2009).
Seeds, A. J. et al. Microwave Photonics. J. Light. Technol. 24, 4628-4641 (2006).
Shi, W., et al. Research on the Failure Mechanism of High-Power GaAs Pcss. IEEE Trans. Power Electron. 30, 2427-2434 (2015).
Smit, M., et al. Moore's law in photonics. Laser Photonics Rev. 6, 1-13 (2012).
Song, H.-J. et al. Microwave Photonic Mixer Utilizing an InGaAs Photoconductor for Radio over Fiber Applications. IEICE Trans. Electron. E90-C, 457-464 (2007).
Tan, K. H. et al. 1.55-$mu$ m GaNAsSb-Based Photoconductive Switch for Microwave Switching. IEEE Photonics Technol. Lett. 22, 1105-1107 (2010).
Tripon-Canseliet, C. et al. Microwave On/Off Ratio Enhancement of GaAs Photoconductive Switches at Nanometer Scale. J. Light. Technol. 30, 3576-3579 (2012).
Tripon-Canseliet, C. et al. Optically controlled microwave phase shifting and sampling by efficient photoconductive switching on LT-GaAs substrate integrated technology. in Photonics North 2006 6343, 63432K (International Society for Optics and Photonics, 2006).
Wang, C., et al. Sub-Second Switching Speed Polarization-Independent 2 pi Terahertz Phase Shifter. IEEE Photonics J. 9, 1-7 (2017).
Waterhouse, R. et al. Realizing 5G: Microwave Photonics for 5G Mobile Wireless Systems. IEEE Microw. Mag. 16, 84-92 (2015).
Yaacobi, A., et al. Integrated phased array for wide-angle beam steering. Optics letters, 39,4575 (2014).
Yao, J. Microwave Photonics. J. Light. Technol. 27, 314-335 (2009).
Yashchyshyn, Y., et al. Study of active integrated photonic antenna. in 2009 3rd European Conference on Antennas and Propagation 3507-3510 (2009).
Yi, X., et al. Photonic Beamforming Based on Programmable Phase Shifters With Amplitude and Phase Control. IEEE Photonics Technol. Lett. 23, 1286-1288 (2011).

(56) References Cited

OTHER PUBLICATIONS

Zhao, D., et al. Experimental study of silicon-based microwave switches optically driven by LEDs. Microw. Opt. Technol. Lett. 57, 2768-2774.

* cited by examiner

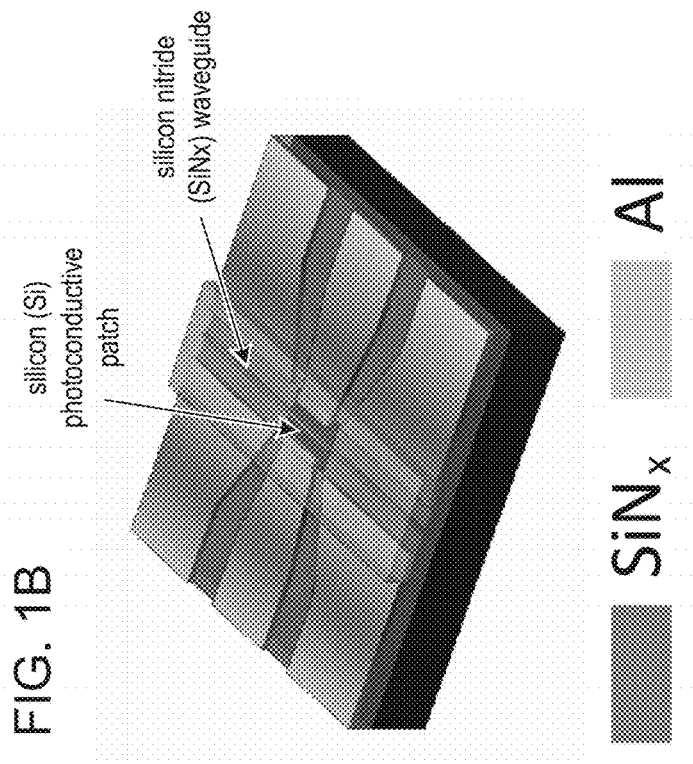
FIG. 1B
FIG. 1A
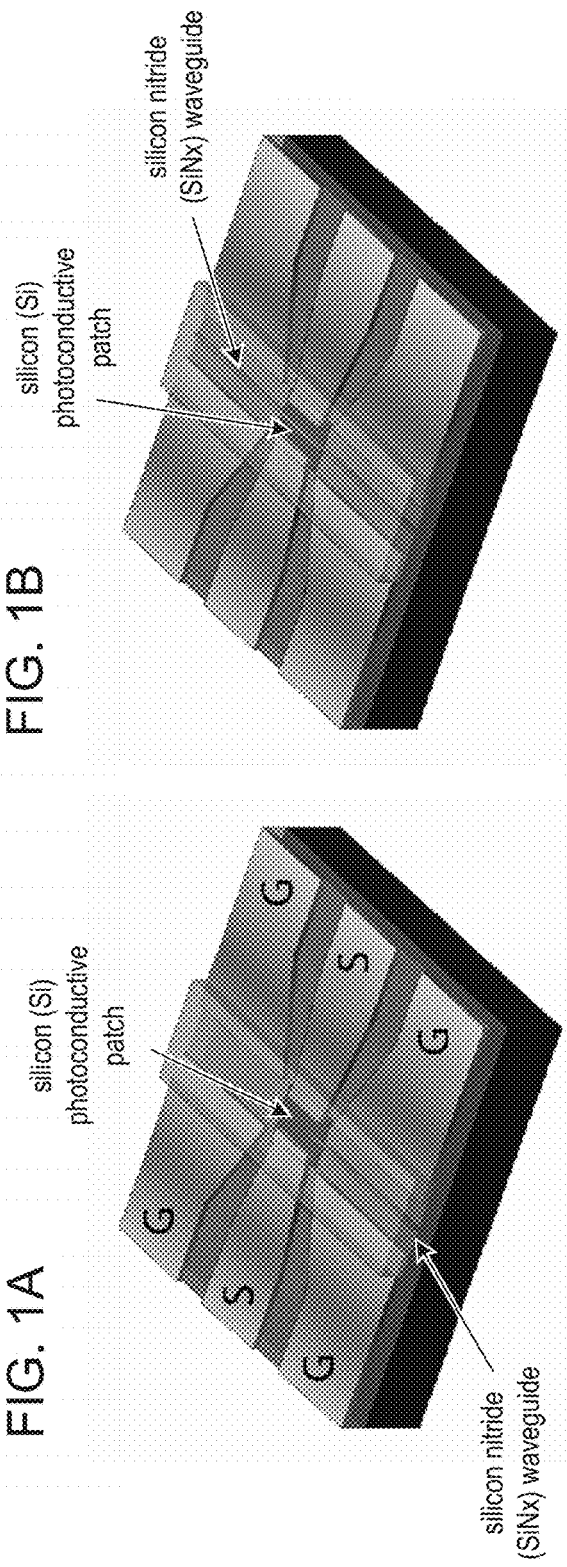
FIG. 1D
FIG. 1C

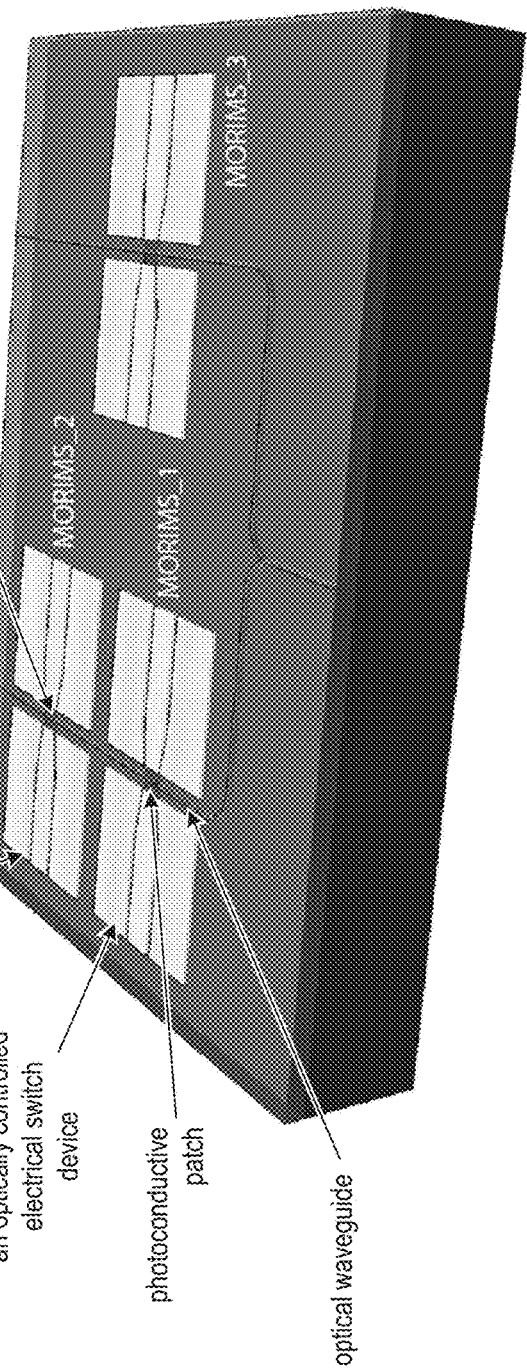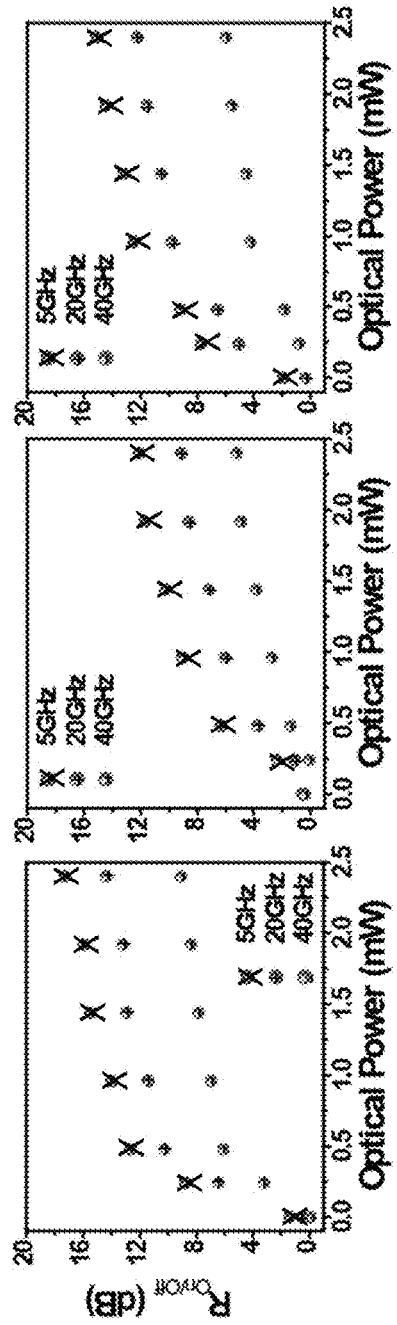
FIG. 3A
FIG. 3B. MORIMS_1　　FIG. 3C. MORIMS_2　　FIG. 3D. MORIMS_3

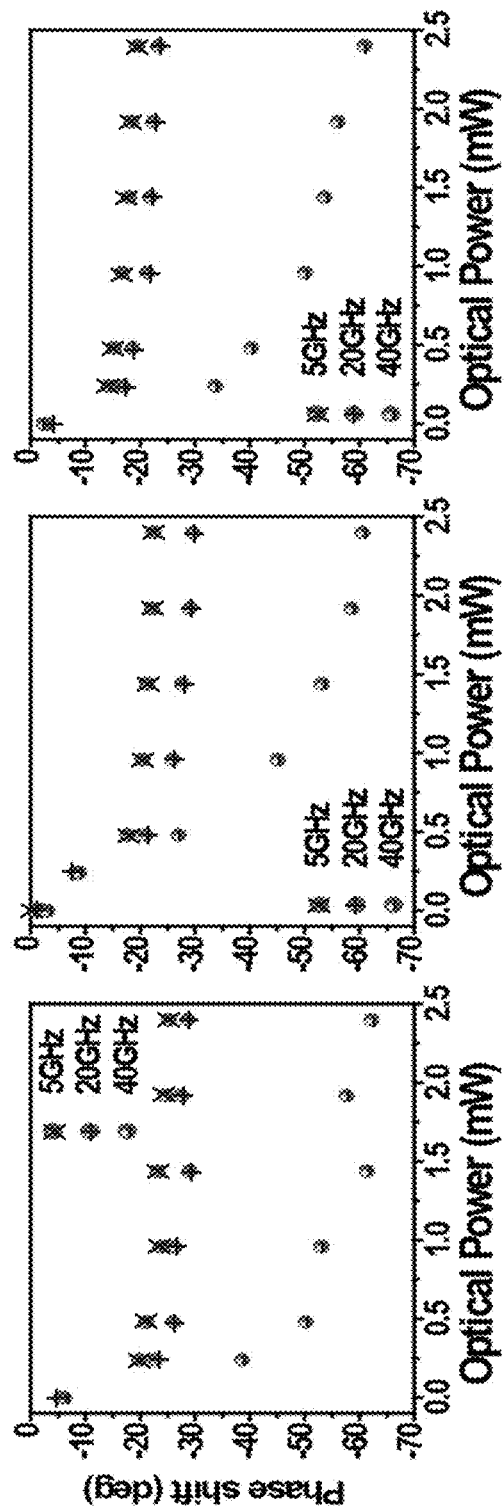

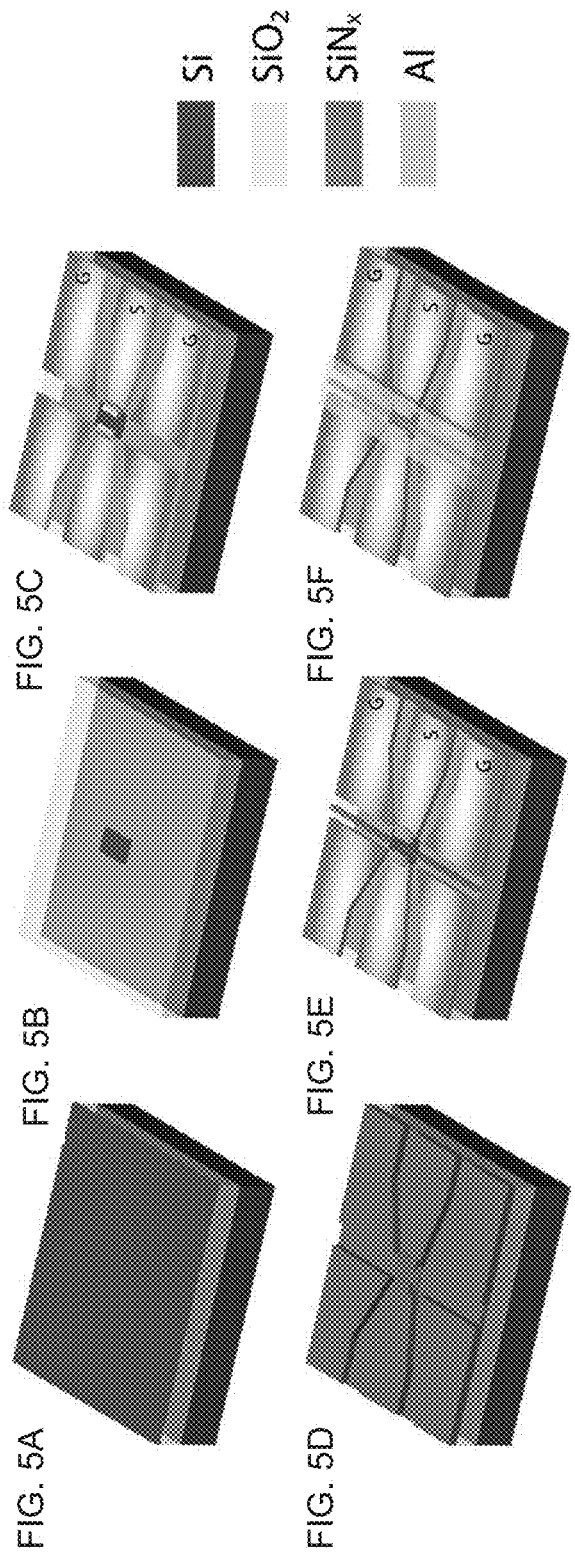

| Year [Ref] | Gain (dB) (f₃dBL₁) | R_bias (MΩ) (f₃dBH₂) | Speed (ps/rise) | Footprint | Photodetector Material | On-chip Integration |
|---|---|---|---|---|---|---|
| 1991 [27] | 45 (1.7GHz) | | | | | No |
| 2006 [28] | | 15.4 (20GHz) 8.7 (35GHz) | 143 | 10 μm×1.6cm | GaAs | No |
| 2007 [29] | 25 (1GHz) | | 90 | Gap: 130 μm | GaAs | No |
| 2008 [30] | 15 (2GHz) | | 15 | 3.2mm×14mm× 0.6mm | GaAs | No |
| 2009 [31] | | | 200 | 1mm×2mm× 0.3mm | Si | No |
| 2010 [32] | 27.4 (2GHz) | 2.9 (40GHz) | 100 | Not report | GaAs | No |
| 2011 [7] | 9 (1.5GHz) | | 40 | 0.25cm²×0.5cm | Si | No |
| 2012 [11] | 18 (3GHz) | | 80 | 100μm×5μm | GaNAsSb | No |
| 2013 [7] | | | 200 | 1mm×2mm× 0.28mm | Si | No |
| 2015 [20] | 9 (3.5GHz) | | 100 | 8.1μm×0.1μm× 150μm | GaAs | No |
| 2016 [19] | 5 (10GHz) | | 20 | 3mm×2mm× 0.28mm | Si | No |
| | | | 62 | 7.1μm×1.4μm | Black Phosphorous | No |
| This work | 29 (1GHz) 25 (5GHz) | 23 (20GHz) 11 (40GHz) | 2 | 12μm×16μm× 250nm | Si | Yes |

Table 1

FIG. 6

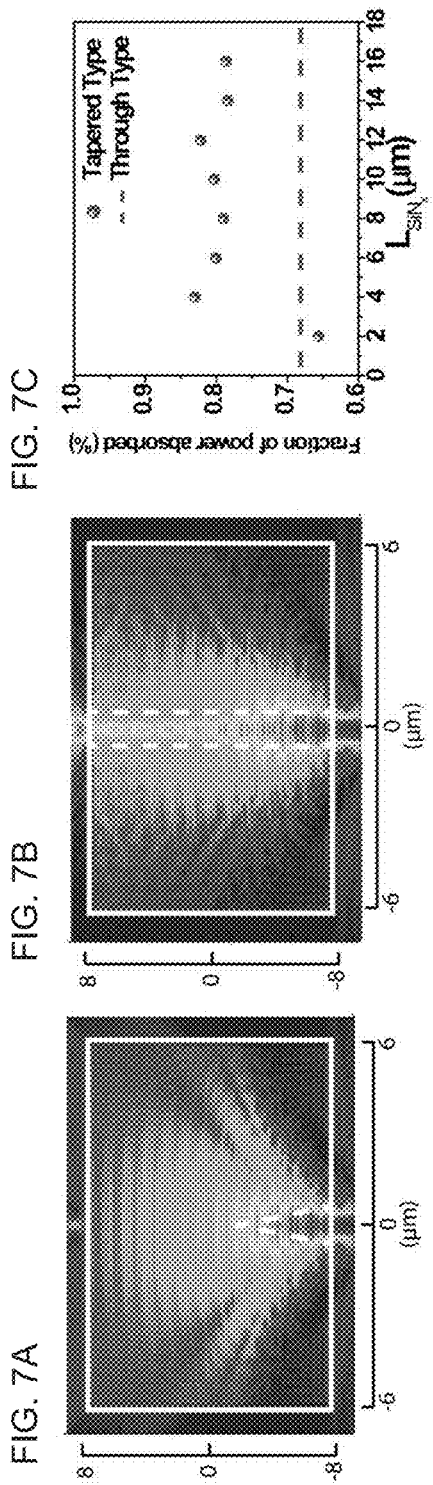

1010 — Receiving a radio frequency input signal at an input port

1020 — Controlling an electrical conduction of the radio frequency input signal through a photoconductive patch via an optical power carried in an optical waveguide and applied to the photoconductive patch, wherein the photoconductive patch electrically connects the input port to an output port providing the radio frequency signal at the output port when a threshold optical power or greater is passed through the optical waveguide, and the photoconductive patch electrically isolates the input port from the output port when less than the threshold optical power is passed through the optical waveguide

FIG 10

OPTICAL CONTROL OF AN ELECTRICAL WAVEGUIDE SWITCH USING A PHOTOCONDUCTIVE PATCH CONTROLLED BY OPTICAL POWER SUPPLIED BY AN OPTICAL WAVEGUIDE

CROSS-REFERENCE TO RELATED APPLICATION

This patent document claims priority to and benefits of U.S. Provisional Patent Application No. 62/893,010, entitled "ULTRA-LOW POWER OPTICALLY RECONFIGURABLE INTEGRATED MICROWAVE SWITCH ON A SILICON PHOTONIC CHIP," filed on Aug. 28, 2019. The entire content of the above patent application is incorporated by reference as part of the disclosure of this patent document.

FEDERALLY SPONSORED RESEARCH OR DEVELOPMENT

This invention was made with government support from the Defense Advanced Research Projects Agency (DARPA) and DARPA NLM, the Office of Naval Research (ONR) Multidisciplinary University Research Initiative (MURI), the National Science Foundation (NSF) Grants DMR-1707641, CBET-1704085, ECCS-1405234, ECCS-1644647, CCF-1640227 and ECCS-1507146, the NSF ERC CLAN, and the Army Research Office (ARO). The government has certain rights in the invention.

TECHNICAL FIELD

This patent document relates to optically controlled microwave and millimeter wave (MMW) switches.

BACKGROUND

Microwave and MMW switches are used in many applications including medical devices, imaging systems, communication systems, space systems, radar systems and many others. New methods and devices are needed to for improved switches.

SUMMARY OF THE INVENTION

Methods, devices, and systems are disclosed for using optically controlled switches to control microwave signals. In one aspect an optically controlled electrical switch device capable of switching microwave or millimeter wave electrical signals is disclosed. The device includes an optical waveguide configured to pass optical power, a photoconductive patch optically coupled to the optical waveguide, and an electrical waveguide with an input port and an output port. In the device, a first side of the photoconductive patch is electrically coupled through a first conductor to the input port and a second side of the photoconductive patch is electrically coupled through a second conductor to the output port. The photoconductive patch is configured to electrically connect the first conductor to the second conductor when a threshold optical power is passed through the optical waveguide, and the photoconductive patch is configured to electrically isolate the first conductor from the second conductor when less than the threshold optical power is passed through the optical waveguide.

In another aspect, a method of switching radio frequency electrical signals is disclosed. The method includes receiving a radio frequency input signal at an input port, and controlling an electrical conduction of the radio frequency input signal through a photoconductive patch via an optical power carried in an optical waveguide and applied to the photoconductive patch. The photoconductive patch electrically connects the input port to an output port providing the radio frequency signal at the output port when a threshold optical power is passed through the optical waveguide, and the photoconductive patch electrically isolates the input port from the output port when less than the threshold optical power is passed through the optical waveguide.

BRIEF DESCRIPTION OF THE FIGURES

FIG. 1A depicts a schematic of a tapered type monolithic optically reconfigurable integrated microwave switches (MORIMS), in accordance with some example embodiments.

FIG. 1B depicts a schematic of a through type MORIMS, in accordance with some example embodiments.

FIG. 1C depicts a side view SEM image of tapered type structure shown in FIG. 1A.

FIG. 1D depicts a side view SEM image of through type structure shown in FIG. 1B.

FIG. 3A depicts an example of a schematic of a MORIMS circuit.

FIG. 3B depicts an example of $R_{on/off}$ at 5, 20 and 40 GHz with respect to incident optical power of MORIMS_1.

FIG. 3C depicts an example of $R_{on/off}$ at 5, 20 and 40 GHz with respect to incident optical power of MORIMS_2.

FIG. 3D depicts an example of $R_{on/off}$ at 5, 20 and 40 GHz with respect to incident optical power of MORIMS_3.

FIG. 4A depicts an example of the relative phase shift at 5, 20 and 40 GHz with respect to optical power of MORIMS_1.

FIG. 4B depicts an example of the relative phase shift at 5, 20 and 40 GHz with respect to optical power of MORIMS_2.

FIG. 4C depicts an example of the relative phase shift at 5, 20 and 40 GHz with respect to optical power of MORIMS_3. The relative positions in FIGS. 4A-4C are the same as in FIG. 3A.

FIG. 5A depicts a schematic of the fabrication process for a 250 nm SOI wafer, in accordance with some example embodiments.

FIG. 5B depicts an example of an E-beam resist pattern and silicon dry etch.

FIG. 5C depicts an example of aluminum transmission line deposition.

FIG. 5D depicts an example of silicon nitride (SiNx) deposition.

FIG. 5E depicts an example of an E-beam resist pattern and silicon nitride (SiNx) waveguide dry etch.

FIG. 5F depicts an example of $SiO_2$ deposition and metal contact opening.

FIG. 6 depicts Table 1 showing examples of different microwave photoconductive switches with their reported frequency, S-parameter on/off ratio, power consumption and device footprint.

FIG. 7A depicts examples of computed local electromagnetic field (|E|) distributions at the height of 125 nm of a tapered type structure in a silicon photoconductive patch.

FIG. 7B depicts examples of computed local electromagnetic field (|E|) distributions at the height of 125 nm of a through type structure in a silicon photoconductive patch. The white solid lines indicate the Si photoconductive patch and the dash lines depict the silicon nitride (SiNx) waveguide on top of the Si photoconductive patch.

FIG. 7C depicts an example of simulated fraction of power absorbed by a Si photoconductive patch of a tapered type structure and a through type structure with different silicon nitride (SiNx) taper lengths.

FIG. 10 depicts an example of a process, in accordance with some example embodiments.

DETAILED DESCRIPTION OF THE INVENTION

Figure 2A:
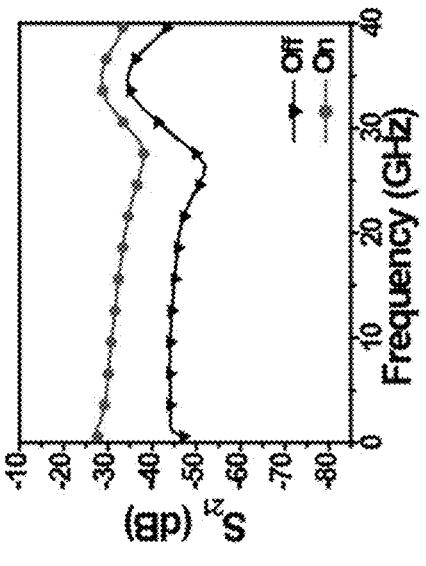
FIG. 2A depicts an example of measured $S_{21}$ of a tapered type MORIMS.

Section headings are used in the present document only for ease of understanding and do not limit the scope of the embodiments to the section in which they are described.

Microwave photonics use light to carry and process microwave signals over a photonic link. However, light can be used as a stimulus for microwave devices that directly control microwave signals. Disclosed are optically controlled amplitude and phase-shift switches that may be used in reconfigurable microwave systems. Disclosed are Monolithic Optically Reconfigurable Integrated Microwave Switches (MORIMSs) built on a CMOS compatible silicon photonic chip. The disclosed scalable micrometer-scale switches provide high switching efficiency and require optical power that is orders of magnitude lower than the state-of-the-art. The disclosed devices may be used in reconfigurable microwave and millimeter wave systems for communication networks as well as other applications.

Reconfigurability including the optical control of power and/or phased-shift of a microwave signal transmitted through an optically controlled microwave device is a useful feature for agile microwave and millimeter wave (MMW) systems. Optically reconfigurable MMW amplitude and phase-shift switches are used for beam steering in RADAR systems, reconfigurable antennas for cellular wireless communications networks, sensing systems, and imaging systems, to name a few potential applications.

An optically controlled switch is a device having an electrical state that can be changed from an insulating state (off state) to a conductive state (on state) by means of an optical signal. Through the use of photoconduction, the illumination with a photon energy larger than the semiconductor bandgap generates electron-hole pairs in a control layer which modifies the electrical conductivity and affects the amplitude and/or phase of an MMW signal.

The disclosed devices use light to control microwave devices or introduce signals into microwave devices to provide for dynamic control, fast response, immunity to electromagnetic interference, and good isolation between the controlling and controlled devices. The disclosed optical devices provide better performance when compared to a classical analogue that utilizes electrical or microelectromechanical systems which are prone to signal distortion and unwanted electromagnetic interference. Various reconfigurable microwave functionalities have been demonstrated including cognitive radio applications, microwave mixers, and phase shifters. Previous optically controlled microwave switches are not suitable for implementation in practical microwave systems because: (i) a lack of scalability and compactness due to the fact that current approaches use free-space or fiber illumination, thus requiring costly and complex packaging and (ii) the optical power level required to perform a switching operation is prohibitively high, e.g., to achieve on/off RF switching with an extinction ratio of ~10 dB requires optical power in the range of tens to several hundreds of a milliwatts. Moreover, photodiode and phototransistors switches can operate at low optical power but require an electrical bias and are not scalable in large high-frequency phased array antenna systems.

The disclosed devices and techniques overcome the foregoing challenges and include the design, fabrication and experimental demonstration of monolithic MORIMSs built on a CMOS compatible silicon photonic chip. Disclosed are the design and fabrication of a MORIMS on a silicon chip such as a silicon-on-insulator (SOI) chip. Silicon nitride waveguides are used to route optical waves towards silicon photoconductive patches to switch microwave signals at different locations on the chip. Photonic integration allows high light coupling efficiency into the silicon photoconductive patches. The integration of microwave circuits and optical waveguides in a CMOS process provides for scalable micrometer-scale switches with higher switching efficiency, a large phase shift and an optical power requirement that is orders of magnitude lower than previous devices.

MORIMS Architecture

The disclosed devices use integrated photonics with one optical waveguide to control multiple microwave switches in different locations on a chip. The multiple switches can be addressed independently or combined with a variety of photonic building blocks such as Y-branches, directional couplers, ring resonators, Mach-Zehnder modulators, etc. Disclosed are two different MORIMSs architectures as illustrated in FIGS. 1A and 1B to meet different demands. Both architectures use a single mode silicon nitride (SiNx) electrical waveguide, silicon (Si) photoconductive patch and aluminum (Al) co-planar optical waveguide transmission lines built on a SOI wafer. The signal electrode gap is made of a Si photoconductive patch that acts as an electrical insulator (off state) but acts as a conductor under illumination (on state). In some example embodiments, the MORIMS device operates at the wavelength of 808 nanometers (nm).

In some example embodiments, a SOI wafer includes a 250 nm thick device layer and a 3 micrometer (μm) thick buried oxide layer. During the fabrication process, most of the silicon material may be removed to form Si photoconductive patches with dimensions of, for example, 16 μm by 12 μm. Single-mode silicon nitride (SiNx) ridge waveguide with the dimensions of 800 nm width and 400 nm height are used to guide light toward Si patches and then to excite the photoconductive patches at different locations on the chip. The ridge waveguide and Si photoconductive patch are cladded by 1 μm thick $SiO_2$ layer. The Ground-Signal-Ground (GSG) transmission lines (e.g., FIG. 1A) consist of 800 nm thick Al lines with a tapered signal electrode toward the Si photoconductive patch.

Two disclosed structures may be referred to as a "tapered" type and a "through" type where each name corresponds to the way the optical waveguide is designed on top of the silicon photoconductive patch to optically control the conductivity of the patch. The "tapered type" structure (FIG. 1A), where the silicon nitride (SiNx) waveguide is tapered on the Si photoconductive patch maximizes the coupling of light from the silicon nitride (SiNx) waveguide to the Si photoconductive patch. In some embodiments of the tapered-type structure, ~84% of the optical energy is coupled into the Si photoconductive patch. Some embodiments of the "through" type structure (FIG. 1B) crossing the Si photoconductive patch can be used in a cascaded configuration, i.e., connecting "optically" different microwave circuits as will be explained further below. This configuration allows ~67% of the energy to be coupled into the silicon patch while the remaining light can be used to control a following microwave circuit. The details of both the optical waveguide and transmission line is detailed below.

FIGS. 1C and 1D show scanning electron micrograph (SEM) images of MORIMSs of both types. The silicon nitride (SiNx) waveguide conformally covers the Si photoconductive patch without any crack or discontinuity. The process is CMOS compatible and the details of the nanofabrication are described below.

Performance of MORIMSs

Figure 2B:
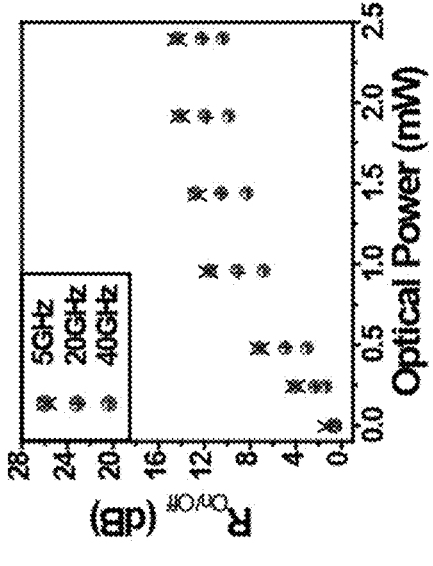
FIG. 2B depicts an example of measured $S_{21}$ of a through type MORIMS
Figure 2C:
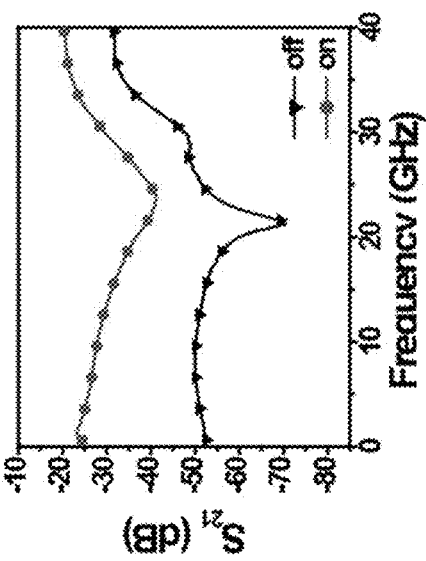
FIG. 2C depicts an example of $R_{on/off}$ with respect to incident optical power of for a tapered type MORIMS.
Figure 2D:
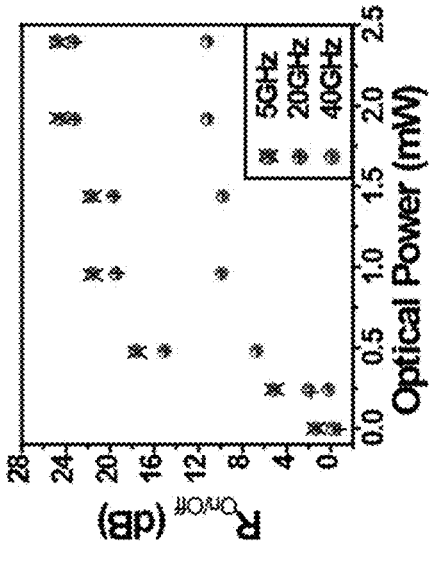
FIG. 2D depicts an example of $R_{on/off}$ with respect to incident optical power of for a through type MORIMS.

The on/off performance of the MORIMS are determined through scattering parameter (S-parameter) measurements. The experimental arrangement details are described below. FIGS. 2A and 2B show the measured $S_{21}$ parameter in dB of the tapered and through type structures in the "on" and "off" states versus Frequency in GHz up to ~40 GHz. In FIG. 2A there is a dip in $S_{21}$ at a frequency of about 21 GHz. This is due to the imperfection of the transmission line. More precisely, the 21 GHz frequency corresponds to free spectral range between the probe and the gap. The fact that this frequency shifts slightly when the gap is illuminated testifies a change of the dielectric constant. To characterize the switch performance, the extinction ratio $R_{on/off}=|S_{21}(on)/S_{21}(off)|$ may be used as figure of merit that qualifies switching efficiency for a given microwave frequency. FIGS. 2C and 2D show $R_{on/off}$ in dB with respect of input optical power in mW at RF frequencies of 5 GHz, 20 GHz, and 40 GHz. Overall, the on/off ratios increase linearly from 0 to ~1.5 mW before reaching a saturation plateau. The tapered type switch shows higher performance, with switching efficiency of ~25 dB at 5 GHz and ~23 dB at 20 GHz compared to −14 dB at 5 GHz and ~12 dB at 20 GHz for the through type configuration. Although the through type is less efficient with same incident optical power, the remaining energy in the waveguide can be used to control another switch. The switching time of the disclosed devices is approximately a few micro-seconds which is compatible with beamsteering and beamforming applications.

FIG. 6 at Table 1 shows the state-of-art photoconductive switches in terms of switching performance, optical power requirement and footprint. Since most of the literature has reported switching at low frequencies and few demonstrations have been done at high RF frequencies, the switching performances are compared at frequencies below and above 10 GHz. The disclosed MORIMSs provide higher performance, i.e., ~29 dB ~25 dB, ~23 dB and 11 dB switching efficiency at 1, 5, 20 and 40 GHz, respectively, while using less than 2 mW which is by orders of magnitude lower than free-space illumination-based switches. Because of the integration, the MORIMS have an ultra-compact footprint that allows for a high-density of packing.

Performance of Cascaded MORIMSs

To demonstrate scalability and the integration of multiple reconfigurable switches in one chip without degrading switching performance, three optically reconfigurable switches were characterized as depicted in FIG. 3A. The MORIMSs in series and in parallel are fed by one input optical waveguide. The injected light was routed toward two different paths using a 3 dB Y-branch coupler. One of the paths addresses two cascaded through type MORIMSs. FIGS. 3B-3D show $R_{on/off}$ for different configurations. Because MORIMS_1 and 3 are in parallel as shown in FIG. 3A, MORIMS_1 and 3 show the same performance. For instance, switching efficiency or MORIMS_1 and 3 reaches ~10 dB at 20 GHz. The switching efficiency of MORIMS_2 as shown in FIG. 3B (i.e, in series with MORIMS_1) drops by only ~4 dB at 20 GHz. To further demonstrate that this architecture for use in phased array systems, the phase shift introduced by the MORIMS was measured. The relative phase shift of MORIMS_1, 2 and 3 are shown in FIGS. 4A-4C respectively. Phase shifts of 20° and 60° is achieved at 20 GHz and 40 GHz respectively. The phase change reaches saturation at relatively low optical power (~0.5 mW).

In an example implementation, the disclosed devices may be used as phase shifters in a phased array antenna for beam steering by tailoring the electric field across an aperture. By adjusting the phases of various elements in the phased array antenna the direction of the collective signal can be controlled without mechanically steering the antenna. MORIMS shows promising performances for cascaded optically reconfigurable switches for frequency and phased array systems.

The disclosed optically reconfigurable switches can be implemented in beamforming and beam steering microwave systems where a moderate switching time constant is appropriate. Moreover, the disclosed integrated devices can be used with ring resonators, directional couplers and Mach-Zehnder modulators on the same chip. The disclosed approach can be tailored in the future generation of ultra-high frequency communications systems which will face stringent requirements in terms of frequency, bandwidth, power consumption, size, packing density, and cost.

The disclosed approach can be used in sampling applications that require the combination of several switches with accurate time delays between them. The disclosed devices add value to the development of integrated technologies for microwave signal processing. In some example embodiments, a microwave signal is optically processed in the microwave domain directly, thus relaxing the need for up-converting the microwave signal to an optical carrier which leads to conversion losses and additive noise. Accordingly, the MORIMS architecture can be directly implemented in microwave sub-systems such tunable microwave filters of larger systems including phased array antennas and many other types of systems.

Disclosed are monolithic optically reconfigurable integrated microwave switches on a SOI chip. Some of the disclosed techniques consist of co-integration of microwave circuits with integrated photonic devices to form optically reconfigurable microwave switches. A single input silicon nitride (SiNx) waveguide can used to route the light toward switches at different locations on chip. Integrated photonics provide miniaturized Si photoconductive patches, high confinement of light in the waveguide and high coupling efficiency of light from the waveguide to the silicon photoconductive microwave switches. The disclosed devices outperform their classical analogues in terms of on/off switching efficiency, footprint, and optical power requirement. Switching performance of over 25 dB at around 5 GHz, 23 dB at around 20 GHz and 11 dB at around 40 GHz, and a lower optical power requirement (— 2 mW) by orders of magnitude lower than the state-of-art photoconductive switches. Scalability is a challenge that has been also advanced by demonstrating integrated multiple reconfigurable switches on the same SOI chip with high amplitude switching performance. Moreover, phase shifts of 20° and 60° were measured for microwave signals at 20 GHz and 40 GHz, respectively.

MORIMSs Fabrication

MORIMSs may be fabricated on an SOI wafer such as a 250 nm thick device layer and a 3 μm thick buried oxide layer as shown in FIG. 5A. One of the first steps is to form a Si photoconductive patch. For example, a 16 μm by 12 μm rectangle of hydrogen silsesquioxane (HSQ) may be patterned through electron-beam lithography. Reactive ion etching (RIE) with a gas mixture of $SF_6$ and $C_4F_8$ may be used for silicon etching which is schematically shown in FIG. 5B. Next, the Al transmission lines may be defined by another step of electron-beam lithography with Polymethyl methacrylate (PMMA) as the resist followed by 800 nm Al electron beam deposition. A lift-off process may then be conducted to form the transmission line shown in FIG. 5C. To fabricate a silicon nitride (SiNx) waveguide, a 400 nm thick silicon nitride (SiNx) layer may be deposited on top of the wafer through plasma-enhanced chemical vapor deposition (PECVD) as shown in FIG. 5D. Electron-beam resist HSQ may then be spun on and a lithography performed to form the waveguides. After development, another RIE etching process with gas mixture of $SF_6$ and $C_4F_8$ may be used to form the waveguide structure as shown in FIG. 5E. The waveguide may be cladded by 1 μm thick silicon oxide deposited using PECVD. The metal contact region was opened using photolithography and dry etching the $SiO_2$ layer shown in FIG. 5F.

Characterization

In some implementations, to optically control the switches, a constant wave (CW) 808 nm fiber coupled semiconductor laser (Thorlabs FPL808S) may be used. The laser may be coupled into a single mode fiber where one end is cleaved and positioned to edge couple to the silicon nitride (SiNx) input waveguide. The microwave on/off response is measured by a 2-port vector network analyzer (VNA, e.g., Agilent E8361C PNA Microwave Network Analyzer) at a frequency band between 80 MHz and 40 GHz. GSG probes may be connected to the Al co-planar transmission lines at both ends separated by the Si photoconductive patch. S-parameter coefficients may then be measured at different optical powers.

Tapered-Type and Through-Type MORIMS

Finite-difference time-domain simulations may be used to optimize the transfer of light from the silicon nitride (SiNx) waveguide to the Si photoconductive patch. In the tapered type design, the silicon nitride (SiNx) is tapered along the Si photoconductive patch and the waveguide fully crosses the photoconductive patch. FIGS. 7A and 7B show the distributions of the amplitude of the optical electromagnetic field within the Si photoconductive patches in the tapered-type and through-type, respectively. In the tapered type structure of FIG. 7A, the incident light spreads out laterally within the Si photoconductive patch. In the through type structure of FIG. 7B, the electric field spreads less and the energy therein is exchanged coherently between the silicon nitride (SiNx) waveguide and the Si patch along the propagation direction. This configuration allows the remaining light to be re-used for controlling another MORIMS nearby as shown later. FIG. 7C shows the fraction of optical power absorbed in % by Si photoconductive patch with different taper lengths $L_{SiNx}$ (μm). The tapered-type structure allows ~84% of the light to be coupled into the Si photoconductive patch. In some example embodiments, the length of the taper affects the coupling efficiency between the waveguide and Si slab. For sake of comparison, the through type structures allows ~67% of the energy to be coupled into the silicon patch.

Gap Effect in Ground Electrodes

Figure 8B:
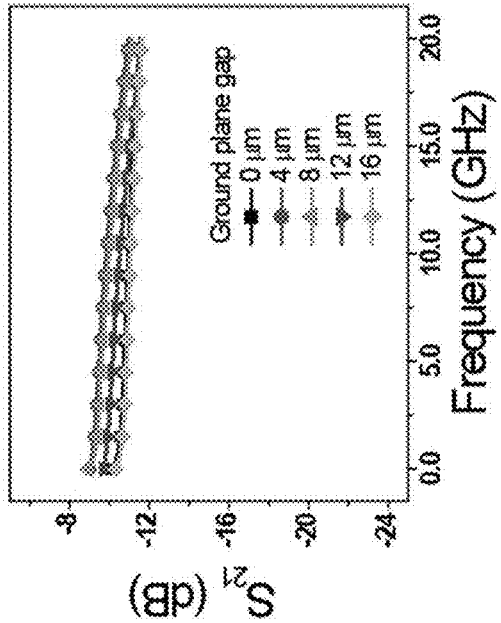
FIG. 8B depicts a simulated $S_{21}$ with different ground electrodes gap in an on state.
Figure 8A:
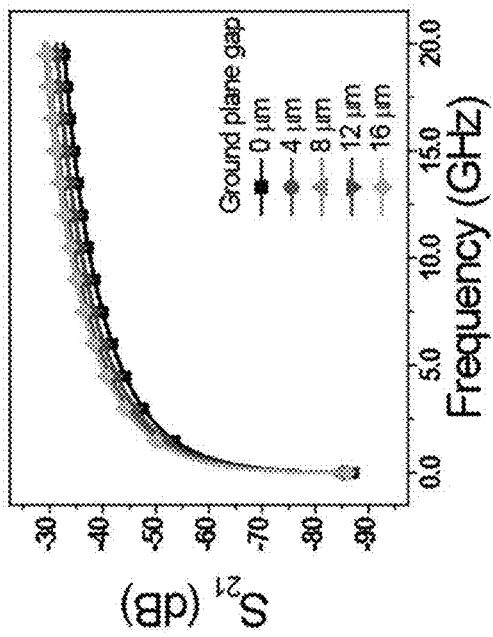
FIG. 8A depicts a simulated $S_{21}$ with different ground electrodes gap in an off state.

The ground-signal-ground metal contacts on both ends of a device match the 50Ω, impedance of the probes that connect to the microwave source. In some embodiments, the input and output silicon nitride (SiNx) waveguide cut through the ground-plane leaving a gap between them. To observe the effect of a gap in the ground planes, the S-parameters may be determined for different ground plane gaps using, for example, a simulation tool such as CST Microwave Studio. The device design is the same as shown in FIG. 1 except the gap width in the ground plane. FIGS. 8A-8B show $S_{21}$ parameter in dB at both on and off states with different ground gaps. In the off state shown in FIG. 8A, the intrinsic Si channel is not conductive and $S_{21}$ with different ground plane gaps (i.e., 0 μm, 4 μm, 8 μm, 12 μm and 16 μm) does not show significant differences. FIG. 8B shows the $S_{21}$ in the on state (with Si conductivity of 2000 S/m). Although the different ground gaps show slightly different $S_{21}$ values, compared to the 20 dB on/off ratio, the ground plane gap does not affect the device performance. Moreover, the microwave wavelength is on the order of centimeter, so the micrometer scale the ground plane gap does not play an important role in microwave signal transmission.

Additional Photoconductivity Induced by the Laser in Si Patch

To further show that the power consumption is small for MORIMSs, the additional conductivity of the Si photoconductive patch was estimated in the on state using the following equations:

$$\Delta \sigma_s = q(\mu_n + \mu_p) a \beta \alpha \tau I_p, \quad \text{(Equation 1)}$$

$$I_p = \frac{P\lambda}{Ahc}, \quad \text{(Equation 2)}$$

where q is electrical change, $\Delta\sigma_s$ is the additional conductivity under illumination, $\mu_n$ and $\mu_p$ are the mobility of electrons and hole, respectively, a represents the amount of light being sent into the Si photoconductive patch. β is the quantum efficiency, α is the absorption coefficient of Si at 800 nm, τ is the carrier life time considering the surface recombination due to the small dimension of the Si patch, Ip is the photon density, P is the optical power, λ is the wavelength, A is the illumination area, h is the Plank constant, and c is the speed of light.

In some embodiments, the additional conductivity of the photoconductive Si patch is on the order of 2000 S/m when the incident power is at 2 mW. Because the light absorbing photoconductive Si region is 16 μm by 12 μm, the device consumes much less optical power than a free-space illumination scheme.

$S_{21}$(on) in the on state at DC may be calculated using the additional conductivity from Equations 1 and 2 and the following:

$$S_{21}(\text{on}) = \frac{2Z_0 Gg}{1 + 2Z_0 Gg} \quad \text{(Equation 3)}$$

$$Gg = \Delta\sigma \frac{A}{L} \quad \text{(Equation 4)}$$

where $Z_0$ (impedance) is 50Ω, Gg is the conductance, A is the cross-section, and L is the length of the Si photoconductive patch. The calculation shows $S_{21}$ (on) is about −20 dB when the additional conductivity is 20005/m which is consistent with experimental results from fabricated devices at an incident power of 2 mW. The $S_{21}$ (On) of the device could be further improved by using a doped wafer without sacrificing the ratio $R_{on}/R_{off}$.

Applying MORIMSs to Photonics

Disclosed is an architecture where the building blocks can route light towards different MORIMSs or modulate an optical signal in order to introduce additional information/signal through mixing the RF/MW and the modulated optical signal.

Figure 9:
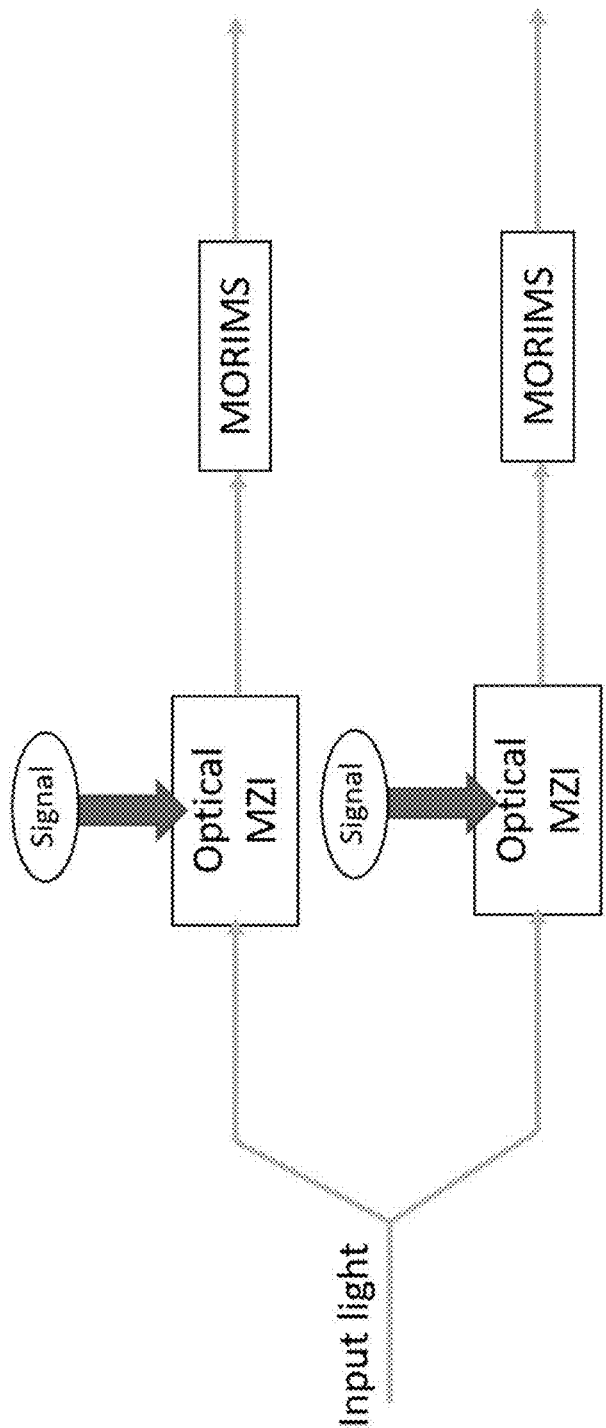
FIG. 9 depicts a schematic of an advanced architecture where optical Mach-Zehnder interferometer (MZI) can be combined with MORIMSs.

FIG. 9 shows an example of a schematic of MORIMSs as part of an on-chip interconnect system. For example, a directional coupler may be used to split into 2 branches for controlling a phased array antenna. Each arm may include an optical Mach-Zehnder interferometer (MZI). By controlling the phase difference in the MZI, the intensity of the optical power that is fed into the MORIMs can be controlled.

FIG. 10 depicts an example of a process, in accordance with some example embodiments. At 1010, the process includes receiving a radio frequency input signal at an input port. At 1020, the process includes controlling an electrical conduction of the radio frequency input signal through a photoconductive patch via an optical power carried in an optical waveguide and applied to the photoconductive patch. The photoconductive patch electrically connects the input port to an output port providing the radio frequency signal at the output port when a threshold optical power or greater is passed through the optical waveguide, and the photoconductive patch electrically isolates the input port from the output port when less than the threshold optical power is passed through the optical waveguide.

In some embodiments, the input light can carry a signal which may result in mixing. For sampling applications, it can also be done using such a scheme provided the time response of the photoconductive material is short enough. In this condition, the optical MZI can be controlled such that optical pulses with fixed interval in time domain feed the MORIMSs.

The technical solutions described by the following clauses may be preferably implemented by some embodiments.

Clause 1. An optically controlled electrical switch device capable of switching microwave or millimeter wave electrical signals, comprising: an optical waveguide configured to pass optical power; a photoconductive patch optically coupled to the optical waveguide; and an input port and an output port with an electrical waveguide electrically connecting the input port to the output port, wherein a first side of the photoconductive patch is electrically coupled through a first conductor to the input port and a second side of the photoconductive patch is electrically coupled through a second conductor to the output port, and wherein the photoconductive patch is configured to electrically connect the first conductor to the second conductor when a threshold optical power or greater is passed through the optical waveguide, and the photoconductive patch is configured to electrically isolate the first conductor from the second conductor when less than the threshold optical power is passed through the optical waveguide. Examples of implementations of the features of clause 1 include FIGS. 1A, 1B, 3A, 5E, and others.

Clause 2. The optically controlled electrical switch device as in clause 1, wherein the optical waveguide enters a first side of the photoconductive patch, tapers in width, and terminates inside the photoconductive patch before reaching a second side of the photoconductive patch. An example implementation of the features of clause 2 includes FIG. 1A.

Clause 3. The optically controlled electrical switch device as in clause 1, wherein the optical power enters a first side of the photoconductive patch, passes through the photoconductive patch, and exits the photoconductive patch on a second side. Example implementations of the features of clause 3 include FIGS. 1B and 3A.

Clause 4. The optically controlled electrical switch device as in clause 3, wherein the optical power that exits the photoconductive patch on a second side enters a third side of another photoconductive patch, passes through the other photoconductive patch, and exits the photoconductive patch on a fourth side. An example implementation of the features of clause 4 includes FIG. 3A.

Clause 5. The optically controlled electrical switch device as in clause 1, wherein the after exiting the second side of the photoconductive patch, the optical waveguide extends to another optical waveguide corresponding to another optically controlled electrical switch device. An example implementation of the features of clause 4 includes FIG. 3A.

Clause 6. The optically controlled electrical switch device as in clause 1, wherein the photoconductive patch comprises silicon.

Clause 7. The optically controlled electrical switch device as in clause 1, wherein the optical waveguide comprises silicon nitride.

Clause 8. The optically controlled electrical switch device as in clause 1, wherein the electrical waveguide including the first conductor and the second conductor comprise aluminum.

Clause 9. The optically controlled electrical switch device as in clause 1, wherein the electrical waveguide is in a ground-signal-ground (GSG) waveguide configuration.

Clause 10. The optically controlled electrical switch device as in clause 1, wherein the threshold optical power is about 2.5 milliwatts at a wavelength of about 808 nanometers.

Clause 11. A method of switching radio frequency electrical signals, comprising: receiving a radio frequency input signal at an input port; and controlling an electrical conduction of the radio frequency input signal through a photoconductive patch via an optical power carried in an optical waveguide and applied to the photoconductive patch, wherein the photoconductive patch electrically connects the input port to an output port providing the radio frequency signal at the output port when a threshold optical power or greater is passed through the optical waveguide, and the photoconductive patch electrically isolates the input port from the output port when less than the threshold optical power is passed through the optical waveguide. Examples of implementations of the features of clause 11 include FIGS. 1A, 1B, 3A, 5E, and others.

Clause 12. The method of switching radio frequency electrical signals as in clause 11, wherein the optical power enters a first side of the photoconductive patch, tapers in width, and terminates inside the photoconductive patch before reaching a second side of the photoconductive patch. An example implementation of the features of clause 12 includes FIG. 1A.

Clause 13. The method of switching radio frequency electrical signals as in clause 12, wherein the optical power that exits the photoconductive patch on a second side enters a third side of another photoconductive patch, passes through the other photoconductive patch, and exits the photoconductive patch on a fourth side. Example implementations of the features of clause 13 include FIGS. 1B and 3A.

Clause 14. The method of switching radio frequency electrical signals as in clause 11, wherein the optical waveguide enters a first side of the photoconductive patch, passes through the photoconductive patch, and exits the photoconductive patch on a second side. An example implementation of the features of clause 4 includes FIG. 3A.

Clause 15. The method of switching radio frequency electrical signals as in clause 11, wherein the optical waveguide extends to another optical waveguide corresponding to another optically controlled electrical switch device. An example implementation of the features of clause 4 includes FIG. 3A.

Clause 16. The method of switching radio frequency electrical signals as in clause 11, wherein the photoconductive patch comprises silicon.

Clause 17. The method of switching radio frequency electrical signals as in clause 11, wherein the optical waveguide comprises silicon nitride.

Clause 18. The method of switching radio frequency electrical signals as in clause 11, wherein the electrical waveguide comprises aluminum.

Clause 19. The method of switching radio frequency electrical signals as in clause 11, wherein the electrical waveguide is in a ground-signal-ground (GSG) waveguide configuration.

Clause 20. The method of switching radio frequency electrical signals as in clause 11, wherein the threshold optical power is about 2.5 milliwatts at a wavelength of about 808 nanometers.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An optically controlled electrical switch device capable of switching microwave or millimeter wave electrical signals, comprising:
   an optical waveguide configured to pass optical power;
   a photoconductive patch optically coupled to the optical waveguide; and
   an input port and an output port with an electrical waveguide electrically connecting the input port to the output port,
   wherein a first side of the photoconductive patch is electrically coupled through a first conductor of the electrical waveguide to the input port and a second side of the photoconductive patch is electrically coupled through a second conductor of the electrical waveguide to the output port, and
   wherein the photoconductive patch is configured to electrically connect the first conductor to the second conductor when a threshold optical power is passed through the optical waveguide, and the photoconductive patch is configured to electrically isolate the first conductor from the second conductor when less than the threshold optical power is passed through the optical waveguide,
   wherein the optical power enters a first side of the photoconductive patch, passes through the photoconductive patch, and exits the photoconductive patch on a second side.

2. The optically controlled electrical switch device as in claim 1, wherein the optical waveguide enters a first side of the photoconductive patch, tapers in width, and terminates inside the photoconductive patch before reaching a second side of the photoconductive patch.

3. The optically controlled electrical switch device as in claim 1, wherein the threshold optical power is about 2.5 milliwatts at a wavelength of about 808 nanometers.

4. The optically controlled electrical switch device as in claim 1, wherein the optical power that exits the photoconductive patch on the second side enters a third side of another photoconductive patch, passes through the another photoconductive patch, and exits the another photoconductive patch on a fourth side.

5. The optically controlled electrical switch device as in claim 1, wherein the optical waveguide enters the first side of the photoconductive patch, passes through the photoconductive patch, and exits the photoconductive patch on the second side, and wherein after exiting the second side of the photoconductive patch, the optical waveguide extends to another optical waveguide corresponding to another optically controlled electrical switch device.

6. The optically controlled electrical switch device as in claim 1, wherein the photoconductive patch comprises silicon.

7. The optically controlled electrical switch device as in claim 1, wherein the optical waveguide comprises silicon nitride.

8. The optically controlled electrical switch device as in claim 1, wherein the electrical waveguide including the first conductor and the second conductor comprise aluminum.

9. The optically controlled electrical switch device as in claim 1, wherein the electrical waveguide including the first conductor and the second conductor is in a ground-signal-ground (GSG) waveguide configuration.

10. A method of switching radio frequency electrical signals, comprising:
    receiving a radio frequency input signal at an input port; and
    controlling an electrical conduction of the radio frequency input signal through a photoconductive patch via an optical power carried in an optical waveguide and applied to the photoconductive patch,
    wherein the photoconductive patch electrically connects the input port to an output port providing the radio frequency signal at the output port when a threshold optical power is passed through the optical waveguide, and the photoconductive patch electrically isolates the input port from the output port when less than the threshold optical power is passed through the optical waveguide, wherein the optical waveguide extends to another optical waveguide corresponding to another optically controlled electrical switch device.

11. A method of switching radio frequency electrical signals, comprising:

receiving a radio frequency input signal at an input port of an electrical waveguide; and controlling an electrical conduction of the radio frequency input signal through a photoconductive patch via an optical power carried in an optical waveguide and applied to the photoconductive patch, wherein the photoconductive patch electrically connects the input port to an output port of the electrical waveguide providing the radio frequency signal at the output port when a threshold optical power is passed through the optical waveguide, and the photoconductive patch electrically isolates the input port from the output port when less than the threshold optical power is passed through the optical waveguide, wherein the optical waveguide enters a first side of the photoconductive patch, passes through the photoconductive patch, and exits the photoconductive patch on a second side.

12. The method of switching radio frequency electrical signals as in claim 11, wherein the optical power enters a first side of the photoconductive patch, passes through the photoconductive patch, and exits the photoconductive patch on a second side.

13. The method of switching radio frequency electrical signals as in claim 12, wherein the optical power that exits the photoconductive patch on the second side enters a third side of another photoconductive patch, passes through the another photoconductive patch, and exits the another photoconductive patch on a fourth side.

14. The method of switching radio frequency electrical signals as in claim 11, wherein the threshold optical power is about 2.5 milliwatts at a wavelength of about 808 nanometers.

15. The method of switching radio frequency electrical signals as in claim 11, wherein the optical waveguide extends to another optical waveguide corresponding to another optically controlled electrical switch device.

16. The method of switching radio frequency electrical signals as in claim 11, wherein the photoconductive patch comprises silicon.

17. The method of switching radio frequency electrical signals as in claim 11, wherein the optical waveguide comprises silicon nitride.

18. The method of switching radio frequency electrical signals as in claim 11, wherein the electrical waveguide comprises aluminum.

19. The method of switching radio frequency electrical signals as in claim 11, wherein the electrical waveguide is in a ground-signal-ground (GSG) waveguide configuration.

20. An optically controlled electrical switch device capable of switching microwave or millimeter wave electrical signals, comprising:

an optical waveguide configured to pass optical power;

a photoconductive patch optically coupled to the optical waveguide; and an input port and an output port with an electrical waveguide electrically connecting the input port to the output port, wherein a first side of the photoconductive patch is electrically coupled through a first conductor of the electrical waveguide to the input port and a second side of the photoconductive patch is electrically coupled through a second conductor of the electrical waveguide to the output port, and wherein the photoconductive patch is configured to electrically connect the first conductor to the second conductor when a threshold optical power is passed through the optical waveguide, and the photoconductive patch is configured to electrically isolate the first conductor from the second conductor when less than the threshold optical power is passed through the optical waveguide, wherein the electrical waveguide including the first conductor and the second conductor is in a ground-signal-ground (GSG) waveguide configuration.

21. An optically controlled electrical switch device capable of switching microwave or millimeter wave electrical signals, comprising:

an optical waveguide configured to pass optical power;

a photoconductive patch optically coupled to the optical waveguide; and an input port and an output port with an electrical waveguide electrically connecting the input port to the output port, wherein a first side of the photoconductive patch is electrically coupled through a first conductor of the electrical waveguide to the input port and a second side of the photoconductive patch is electrically coupled through a second conductor of the electrical waveguide to the output port, and wherein the photoconductive patch is configured to electrically connect the first conductor to the second conductor when a threshold optical power is passed through the optical waveguide, and the photoconductive patch is configured to electrically isolate the first conductor from the second conductor when less than the threshold optical power is passed through the optical waveguide, wherein the optical waveguide comprises silicon nitride.

* * * * *